(12) United States Patent
Kim et al.

(10) Patent No.: US 11,073,714 B2
(45) Date of Patent: Jul. 27, 2021

(54) LIQUID CRYSTAL DISPLAY DEVICE INCLUDING LIQUID CRYSTAL CAPSULE AND METHOD OF FABRICATING THE SAME

(71) Applicant: LG Display Co., Ltd., Seoul (KR)

(72) Inventors: Kyeong-Jin Kim, Goyang-si (KR); Ji-Na Jeon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 159 days.

(21) Appl. No.: 15/938,135

(22) Filed: Mar. 28, 2018

(65) Prior Publication Data
US 2018/0299712 A1 Oct. 18, 2018

(30) Foreign Application Priority Data

Apr. 13, 2017 (KR) .......................... 10-2017-0048060

(51) Int. Cl.
*G02F 1/13* (2006.01)
*G02F 1/1334* (2006.01)
*G02F 1/1368* (2006.01)
*G02F 1/1341* (2006.01)
*C09K 19/54* (2006.01)
*B01J 13/18* (2006.01)
(Continued)

(52) U.S. Cl.
CPC ............ *G02F 1/1334* (2013.01); *B01J 13/18* (2013.01); *C09K 19/02* (2013.01); *C09K 19/52* (2013.01); *C09K 19/54* (2013.01); *C09K 19/544* (2013.01); *G02F 1/1341* (2013.01); *G02F 1/1368* (2013.01); *G02F 1/13415* (2021.01); *G02F 1/134363* (2013.01); *G02F 1/134372* (2021.01); *G02F 1/136227* (2013.01)

(58) Field of Classification Search
CPC ........................................................ G02F 1/13
See application file for complete search history.

(56) References Cited

U.S. PATENT DOCUMENTS 5,268,783 A * 12/1993 Yoshinaga ........... C09K 19/544
349/10
5,427,713 A * 6/1995 Wartenberg ............ C09K 19/54
252/299.5
(Continued)

FOREIGN PATENT DOCUMENTS

CN 1054493 A 9/1991
CN 102540544 A 7/2012
(Continued)

OTHER PUBLICATIONS

Communication dated Oct. 2, 2018 issued in the corresponding European Patent Application No. 18164407.1, pp. 1-14.
(Continued)

*Primary Examiner* — Chanceity N Robinson
(74) *Attorney, Agent, or Firm* — Polsinelli PC (57) ABSTRACT

A liquid crystal capsule includes: a shell; and a liquid crystal molecule in the shell, wherein a critical surface tension of the shell is smaller than a critical surface tension of the liquid crystal molecule. Further, the liquid crystal molecule includes a nematic liquid crystal and the shell includes polytetramethyldisiloxane. The liquid crystal capsule also includes an additive in the shell and the additive has a critical surface tension smaller than that of the liquid crystal molecule.

6 Claims, 7 Drawing Sheets

(51) Int. Cl.
  *C09K 19/52* (2006.01)
  *C09K 19/02* (2006.01)
  *G02F 1/1362* (2006.01)
  *G02F 1/1343* (2006.01)

(56) References Cited

U.S. PATENT DOCUMENTS

| | | | |
|---|---|---|---|
| 9,366,920 | B2 | 6/2016 | Kim et al. |
| 2002/0054960 | A1* | 5/2002 | Yoon ...................... C09K 19/54 427/402 |
| 2007/0106962 | A1* | 5/2007 | Sakakibara .............. H04N 1/58 716/100 |
| 2015/0109547 | A1 | 4/2015 | Kim et al. |
| 2017/0052404 | A1 | 2/2017 | Kang et al. |
| 2017/0363790 | A1* | 12/2017 | Ooishi ................ H01L 51/5012 |

FOREIGN PATENT DOCUMENTS

| | | | |
|---|---|---|---|
| CN | 103913880 | A | 7/2014 |
| CN | 104570510 | A | 4/2015 |
| CN | 105301823 | A | 2/2016 |
| CN | 105765449 | A | 7/2016 |
| JP | H05-093905 | A * | 4/1993 |
| JP | H05-093905 | A | 4/1993 |
| JP | H0593905 | A * | 4/1993 |
| JP | H07-504763 | A * | 5/1995 |
| JP | H07504763 | A * | 5/1995 |
| JP | 2008-287250 | A | 11/2008 |
| JP | 2016-042203 | A | 3/2016 |
| KR | 1999-0067339 | A | 8/1999 |
| KR | 1999-0068236 | A | 8/1999 |
| KR | 10-0299583 | B1 | 10/2001 |
| KR | 10-2016-0077481 | A | 7/2016 |
| WO | 2004/063309 | A1 | 7/2004 |
| WO | 2016/035453 | A1 | 3/2016 |
| WO | 2016/148430 | A1 | 9/2016 |
| WO | 2017/178419 | A1 | 10/2017 |
| WO | 2018/078078 | A1 | 5/2018 |
| WO | 2018/189068 | A1 | 10/2018 |

OTHER PUBLICATIONS

Schulte, M.D., et al., "The effect of fluorine-substituted acrylate monomers on the electro-optical and morphological properties of polymer dispersed liquid crystals," Liquid Crystals, Taylor & Francis, vol. 27, No. 4, Apr. 1, 2000, pp. 467-475.

Cui et al., P-142: Improvement of PDLC Performance by Changing Surface Anchoring Strength; SID 11 Digest 1641-1644; Chemical Physics Interdisciplinary Program and Liquid Crystal Institute, Kent State University, Kent, Ohio, USA, ISSN 0097-966X/11/4203-1641.

Office Action dated Feb. 15, 2019 with English translation issued in the corresponding Taiwanese Patent Application No. 107110796, pp. 1-10.

Office Action dated Nov. 21, 2019 issued in a related Japanese Patent Application.

Office Action dated Mar. 14, 2019 with English translation issued in the corresponding Japanese Patent Application No. 2018-073530, pp. 1-7.

Search Report dated Feb. 14, 2019 issued in the corresponding European Patent Application No. 18164407.1, pp. 1-17.

Chinese Office Action dated Aug. 27, 2020 issued in corresponding Patent Application No. 201810266962.X w/ English Translation (22 pages).

Korean Office Action dated Jan. 27, 2021 issued in corresponding Patent Application No. 10-2017-0048060 (7 pages).

* cited by examiner

LIQUID CRYSTAL DISPLAY DEVICE INCLUDING LIQUID CRYSTAL CAPSULE AND METHOD OF FABRICATING THE SAME

CROSS-REFERENCE TO RELATED APPLICATION

The present application claims the benefit of priority of Korean Patent Application No. 10-2017-0048060 filed in the Republic of Korea on Apr. 13, 2017, which is hereby incorporated by reference in its entirety for all purposes as if fully set forth herein.

BACKGROUND

Field of the Disclosure

The present disclosure relates to a liquid crystal display device, and more particularly to a liquid crystal display device including a liquid crystal layer of a liquid crystal capsule and a method of fabricating the same.

Description of the Background

Recently, as the information age progresses, display devices capable of processing and displaying a large amount of information have rapidly advanced. For example, various flat panel displays (FPDs) having a thin profile, a light weight and a low power consumption have been researched.

As a result, a thin film transistor liquid crystal display (TFT-LCD) having an excellent color reproducibility and a thin profile has been developed. The LCD device displays an image using an optical anisotropy and a polarization property of a liquid crystal molecule.

The LCD device includes first and second substrates facing and spaced apart from each other and a liquid crystal layer between the first and second substrates. Since the LCD device includes two glass substrates, a weight and a thickness of the LCD device increase and it is not readily applicable to a flexible display device.

To improve the above disadvantages, an LCD device including a liquid crystal capsule where a liquid crystal layer having liquid crystal capsules is formed on a substrate through a coating method has been suggested.

Figure 1:
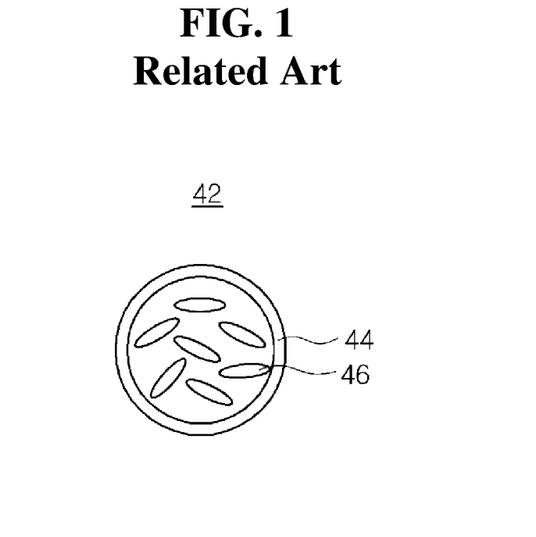
FIG. 1 is a schematic view showing a liquid crystal capsule of a liquid crystal display device according to the related art.

FIG. 1 is a schematic view showing a liquid crystal capsule of a liquid crystal display device according to the related art.

In FIG. 1, a liquid crystal capsule 42 of a liquid crystal display (LCD) device according to the related art includes a shell 44 and a plurality of liquid crystal molecules 46 in the shell 44. When the liquid crystal capsule 42 is applied to the LCD device, a liquid crystal layer may be formed through a simple process such as a coating and curing process to have a simple structure.

When a size (e.g., a diameter) of the liquid crystal capsule 42 is smaller than a wavelength of a visible ray, an optical change such as a scattering due to a difference in a refractive index between a binder and the liquid crystal capsule 42 does not occur. As a result, an optical property such as a transmittance of the LCD device can be improved.

For applying the liquid crystal capsule 42 to the LCD device, a driving voltage of the liquid crystal layer may be set within a maximum supplying voltage of a driving unit. However, since a surface area influenced by an anchoring energy can greatly be increased in the liquid crystal capsule 42, the driving voltage for moving the plurality of liquid crystal molecules 46 excessively increases. For example, the driving voltage may be set over 150V.

To reduce the driving voltage, it is required to reduce the anchoring energy of the shell 44 surrounding the plurality of liquid crystal molecules 46. However, measurement of the anchoring energy of the shell 44 is very complicated and quantization of the anchoring energy is difficult when there is a deviation in uniformity between samples and measurement method.

SUMMARY

Accordingly, the present disclosure is directed to an LCD device including a liquid crystal capsule and a method of fabricating the same that substantially obviate one or more of problems due to limitations and disadvantages of the prior art.

In accordance with the present disclosure, as embodied and broadly described herein, the present disclosure provides a liquid crystal capsule including: a shell; and a liquid crystal molecule in the shell, wherein a critical surface tension of the shell is smaller than a critical surface tension of the liquid crystal molecule.

In another aspect, the present disclosure provides a liquid crystal display device including: a substrate; a thin film transistor in a pixel region on the substrate; a pixel electrode connected to the thin film transistor; a common electrode over the thin film transistor; and a liquid crystal layer over the pixel electrode and the common electrode, the liquid crystal layer including a liquid crystal capsule, wherein the liquid crystal capsule includes: a shell; and a liquid crystal molecule in the shell, wherein a critical surface tension of the shell is smaller than a critical surface tension of the liquid crystal molecule.

In another aspect, the present disclosure provides a liquid crystal capsule including: a shell; a liquid crystal molecule in the shell; and an additive in the shell, wherein a critical surface tension of the additive is smaller than a critical surface tension of the liquid crystal molecule.

In another aspect, the present disclosure provides a liquid crystal display device including: a substrate; a thin film transistor in a pixel region on the substrate; a pixel electrode connected to the thin film transistor; a common electrode over the thin film transistor; and a liquid crystal layer over the pixel electrode and the common electrode, the liquid crystal layer including a liquid crystal capsule, wherein the liquid crystal capsule includes: a shell; a liquid crystal molecule in the shell; and an additive in the shell, wherein a critical surface tension of the additive is smaller than a critical surface tension of the liquid crystal molecule.

In another aspect, the present disclosure provides a method of fabricating a liquid crystal capsule includes: forming a nano emulsion solution by dispersing a mixture of a liquid crystal molecule, a shell monomer and a reactive monomer type additive in a water with a nano size; forming a shell surrounding the liquid crystal molecule and the reactive monomer type additive through a polymerization of the shell monomer by adding a heat to the nano emulsion solution; forming a coating solution by mixing the nano emulsion solution to a binder; forming a coating solution layer by coating the coating solution on a substrate; drying the coating solution layer; and forming an additive layer between the liquid crystal molecule and the shell through lamination of the reactive monomer type additive on an inner surface by irradiating an ultraviolet ray.

In another aspect, the present disclosure provides a method of fabricating a liquid crystal display device including: forming a thin film transistor in a pixel region on a substrate; forming a pixel electrode connected to the thin film transistor; forming a common electrode over the thin film transistor; and forming a liquid crystal layer over the pixel electrode and the common electrode, the liquid crystal layer including a liquid crystal capsule, wherein forming the liquid crystal layer includes: forming a nano emulsion solution by dispersing a mixture of a liquid crystal molecule, a shell monomer and a reactive monomer type additive in a water with a nano size; forming a shell surrounding the liquid crystal molecule and the reactive monomer type additive through a polymerization of the shell monomer by adding a heat to the nano emulsion solution; forming a coating solution by mixing the nano emulsion solution to a binder; forming a coating solution layer by coating the coating solution on the substrate; drying the coating solution layer; and forming an additive layer between the liquid crystal molecule and the shell through lamination of the reactive monomer type additive on an inner surface by irradiating an ultraviolet ray.

It is to be understood that both the foregoing general description and the following detailed description are exemplary and explanatory and are intended to provide further explanation of the aspects as claimed.

BRIEF DESCRIPTION OF THE DRAWINGS

The accompanying drawings, which are included to provide a further understanding of the disclosure and are incorporated in and constitute a part of this application, illustrate aspects and together with the description serve to explain the principles of the disclosure.

In the drawings.

DETAILED DESCRIPTION

Reference will now be made in detail to the present disclosure, examples of which are illustrated in the accompanying drawings. Wherever possible, the same reference numbers will be used throughout the drawings to refer to the same or like parts.

Figure 2:
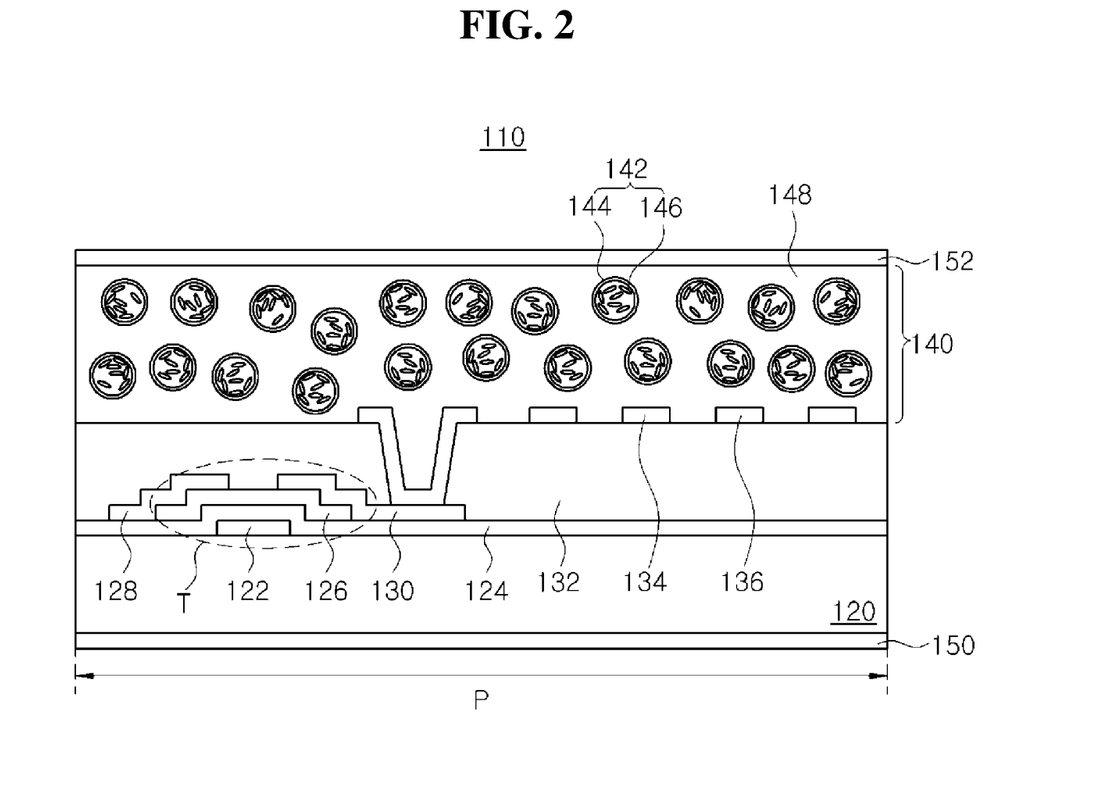
FIG. 2 is a cross-sectional view showing a liquid crystal display device including a liquid crystal capsule according to a first aspect of the present disclosure.

FIG. 2 is a cross-sectional view showing a liquid crystal display device including a liquid crystal capsule according to a first aspect of the present disclosure.

In FIG. 2, a liquid crystal display (LCD) device 110 includes a substrate 120 where a thin film transistor (TFT) T, a pixel electrode 134 and a common electrode 136 are formed and a liquid crystal layer 140 disposed over the substrate 120. A gate electrode 122 is formed in each pixel region P on the substrate 120, and a gate insulating layer 124 is formed on the gate electrode 122 including the substrate 120. A semiconductor layer 126 is formed on the gate insulating layer 124 corresponding to the gate electrode 122, and a source electrode 128 and a drain electrode 130 are formed on both end portions of the semiconductor layer 126. The gate electrode 122, the semiconductor layer 126, the source electrode 128 and the drain electrode 130 constitute the TFT T.

Although not shown, a gate line and a data line are formed on the substrate 120, and the TFT T is connected to the gate line and the data line. The gate line and the data line cross each other to define the pixel region P.

An interlayer insulating layer 132 is formed on the TFT T and over the substrate 120, and the pixel electrode 134 and the common electrode 136 spaced apart from each other are formed in the pixel region P on the interlayer insulating layer 132. The interlayer insulating layer 132 has a drain contact hole exposing a portion of the drain electrode 130, and the pixel electrode 134 is connected to the drain electrode 130 through the drain contact hole. Each of the pixel electrode 134 and the common electrode 136 may have a shape of a plurality of bars.

Although an in-plane switching (IPS) mode LCD device where the pixel electrode 134 and the common electrode 136 may be formed as the same layer is exemplarily shown in the first aspect, an IPS mode LCD device where a pixel electrode and a common electrode may be formed as the different layer may be shown in another aspect. Alternatively, a fringe field switching (FFS) mode LCD device where a pixel electrode of a shape of a plurality of bars (or a shape of a plate having a plurality of slits) is formed over a common electrode of a shape of a plate or an FFS mode LCD device where a common electrode of a shape of a plurality of bars (or a shape of a plate having a plurality of slits) is formed over a pixel electrode of a shape of a plate may be shown in another aspect.

Although not shown, a color filter layer may be formed under the TFT T, between the TFT T and the pixel electrode 134 or between the TFT T and the common electrode 136.

A liquid crystal layer 140 is formed on the pixel electrode 134 and the common electrode 140. The liquid crystal layer 140 includes a plurality of liquid crystal capsules 142 and a binder 148 where the plurality of liquid crystal capsules 142 are dispersed, and each of the plurality of liquid crystal capsules 142 includes a shell 144 and a plurality of liquid crystal molecules 146 dispersed in the shell 144.

For example, the liquid crystal layer 140 may have a thickness of about 1 μm to about 4 μm. The binder 148 may be transparent or translucent, and the binder 148 may be formed of a water soluble material, a fat soluble material or a mixed material of the water soluble material and the fat soluble material. The shell 144 of each of the plurality of liquid crystal capsules 142 may be a polymer capsule having a diameter of about 1 nm to about 999 nm. For example, the shell 144 may have a diameter within a range of about 1 nm to about 320 nm.

The plurality of liquid crystal molecules 146 may include at least one of a nematic liquid crystal, a ferroelectric liquid crystal and a flexo electric liquid crystal. For example, a volume ratio of the plurality of liquid crystal capsules 142 to the liquid crystal layer 140 may be within a range of about 50% to about 80%. A refractive index anisotropy of each of the plurality of liquid crystal molecules 146 may be within a range of about 0.18 to about 0.30, and a dielectric anisotropy of each of the plurality of liquid crystal molecules 146 may be within a range of about 35 to about 100. A first polarizing layer 150 is formed under the substrate 120 and a second polarizing layer 152 is formed on the liquid crystal layer 140.

In the LCD device 110 including the liquid crystal capsule according to the first aspect of the present disclosure, a critical surface tension of the shell 144 is smaller than a critical surface tension of the plurality of liquid crystal molecules 146. As a result, an anchoring energy of the liquid crystal capsule 142 is reduced and a driving voltage of the liquid crystal layer 140 is reduced.

Figure 3A:
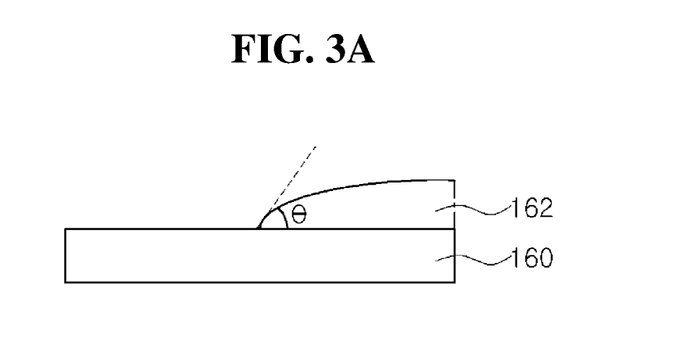
FIG. 3A is a view illustrating a measurement method of a contact angle of a low molecule droplet with respect to a polymer material in a liquid crystal display device including a liquid crystal capsule according to a first aspect of the present disclosure.
Figure 3B:
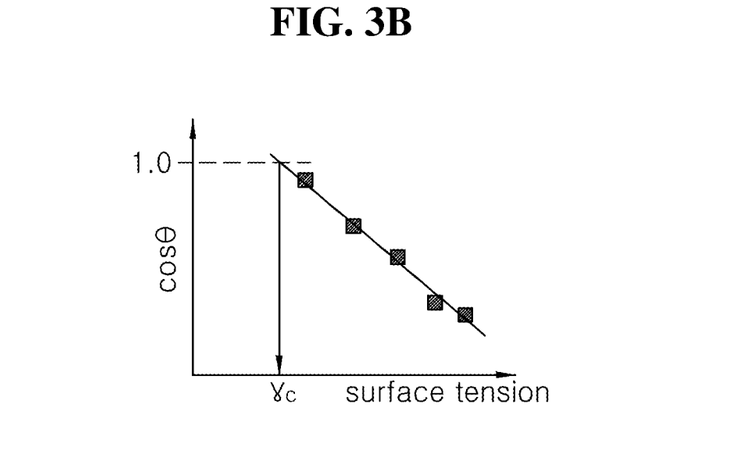
FIG. 3B is a view illustrating a calculation method of a critical surface tension of a polymer material in a liquid crystal display device including a liquid crystal capsule according to an aspect of the present disclosure.

FIG. 3A is a schematic view illustrating a measurement method of a contact angle of a low molecule droplet with respect to a polymer material in a liquid crystal display device including a liquid crystal capsule according to an aspect of the present disclosure, and FIG. 3B is a view illustrating a calculation method of a critical surface tension of a polymer material in a liquid crystal display device including a liquid crystal capsule according to an aspect of the present disclosure.

In FIG. 3A, a contact angle θ of an edge portion of each of a plurality of low molecule droplets 162 is measured in a state where the plurality of low molecule droplets 162 are coated on a polymer material 160.

In FIG. 3B, after a graph of a cosine value (cos θ) of the contact angle θ of the plurality of low molecule droplets 162 with respect to a surface tension of the polymer material 160 is drawn, a surface tension may be defined as a critical surface tension $\gamma_c$ of the polymer material 160 when the cosine value (cos θ) of the contact angle θ becomes 1.0 by extension of the graph (i.e., when the contact angle θ becomes 0 degree). The critical surface tension $\gamma_c$ is a force per unit area and has a unit of $erg/cm^2 = mJ/m^2 = mN/m = dyn/cm$.

Figure 4:
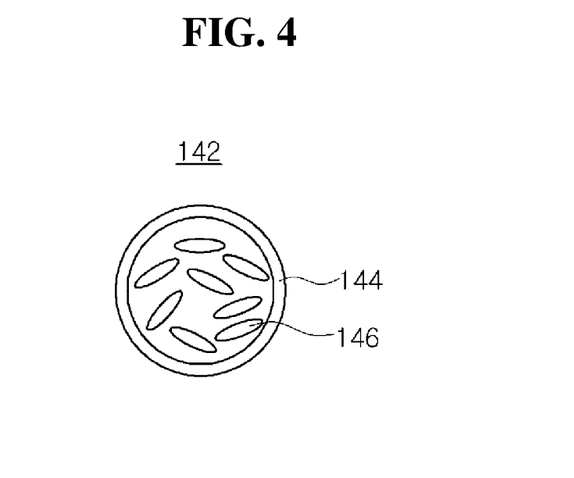
FIG. 4 is a schematic view showing a liquid crystal capsule according to an aspect of the present disclosure.

FIG. 4 is a schematic view showing a liquid crystal capsule according to an aspect of the present disclosure.

In FIG. 4, a liquid crystal capsule 142 according to an aspect of the present disclosure includes a shell 144 and a plurality of liquid crystal molecules 146 dispersed in the shell 144. The shell 144 may include a polymer material having a critical surface tension $\gamma_c$ smaller than a critical surface tension $\gamma_c$ of the plurality of liquid crystal molecules 146 as a host. As a result, an anchoring energy of the liquid crystal capsule 142 is reduced and a driving voltage of the liquid crystal layer 140 (of FIG. 2) is reduced below about 60V so that the liquid crystal capsule 142 can be applied to the LCD device 110.

The shell 144 surrounds an outer surface of a core material including the plurality of liquid crystal molecules 146 and having a spherical droplet in an initial state to function as an outer wall fixing the core material. The core material including the plurality of liquid crystal molecules 146 may exist in a state confined in the shell 144 of the polymer material.

The polymer material of the shell 144 may be classified into a water soluble polymer material and a water insoluble (i.e., an oil soluble) polymer material. For example, the water soluble polymer material may include at least one of polyvinyl alcohol (PVA), starch, carboxyl methyl cellulose (CMC), methyl cellulose, ethyl cellulose, polyvinyl pyrrolidone, gelatin, alginate, casein and gum arabia. In addition, the water insoluble polymer material may include at least one of polymethylmethacrylate (PMMA), polyurea, polyurethane, urea formaldehyde (UF), and amino resin such as melamine formaldehyde (MF).

Although the shell 144 has a single-layered structure in an aspect, the shell may have a double-layered structure in another aspect. For example, the shell may include an inner shell and an outer shell of different polymer materials, and the outer shell may be formed after the inner shell is formed. The shell of a double-layered structure may have an easily adjustable anchoring energy and an excellent solvent resistant property as compared with the shell of a single-layered structure. For example, the inner shell may be formed of a water soluble polymer (e.g., a single or mixed solution of gelatin, arabic gum and PVA), and the outer shell may be formed of a water insoluble polymer (e.g., a single or mixed solution of amino resin, polyamide epichlorohydrin resin and formaldehyde resin.

The binder 148 shown in FIG. 2 confines the plurality of liquid crystal capsules 142 to be dispersed and fixed and fixes the plurality of liquid crystal capsules 142 to the substrate 120 (of FIG. 2). A polymer material of the binder 148 may be classified into a water soluble polymer material and a water dispersible polymer material. For example, the water soluble polymer material may include at least one of polyvinyl alcohol (PVA), starch, methoxy cellulose, hydroxy ethylcellulose, carboxyl methyl cellulose (CMC), methyl cellulose, ethyl cellulose, polyacrylate soda, acryl amide/acrylate copolymer, acryl amide/acrylate/methacrylic acid terpolymer, polyacrylamide, alginate soda, polyvinyl pyrrolidone, gelatin, alginate, casein and gum arabia. In addition, the water dispersible polymer material may include at least one of alkyd resin, polyamide epichlorohydrin resin, polyurethane resin, urea-formaldehyde resin, melamine-formaldehyde resin, melamine-urea-formaldehyde resin, acrylate copolymer latex, styrene/butadiene copolymer latex, styrene/butadiene/acryl copolymer latex, vinyl acetate resin emulsion, vinyl acetate/acrylate copolymer emulsion, styrene/acrylate copolymer emulsion and acrylate resin emulsion.

Since the shell 144 is formed of the polymer material having a critical surface tension $\gamma_c$ smaller than a critical surface tension $\gamma_c$ of the plurality of liquid crystal molecules 146 among various polymer materials, the anchoring energy of the shell is reduced and the driving voltage of the liquid crystal layer 140 is reduced.

Figure 5:
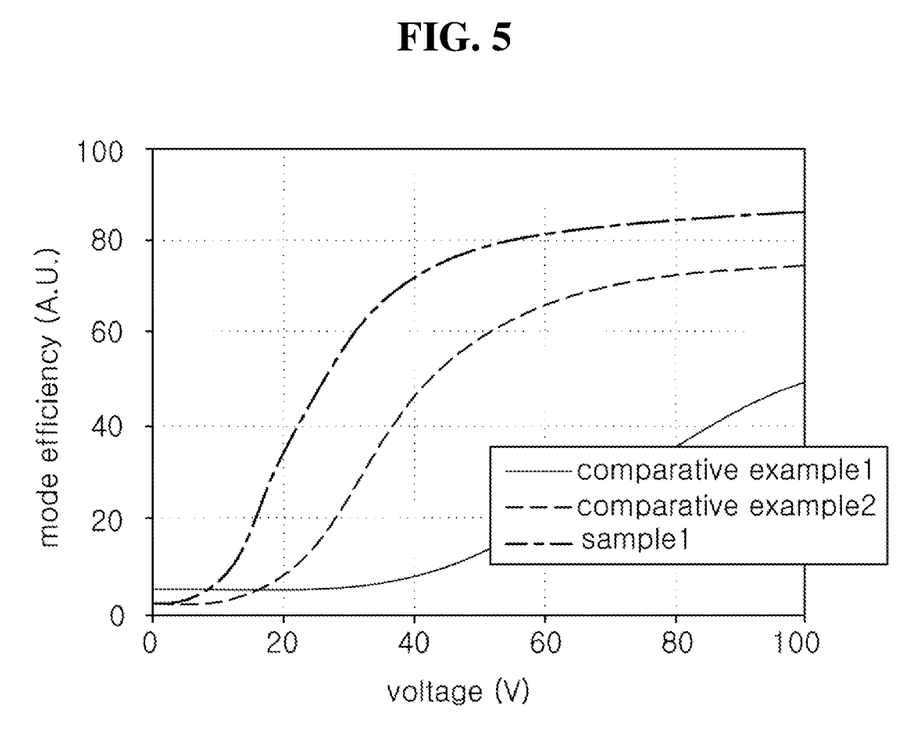
FIG. 5 is a curve showing a mode efficiency of a sample 1 of a liquid crystal capsule according to an aspect of the present disclosure and comparative examples 1 and 2.

TABLE 1 shows a critical surface tension and a driving voltage of a sample 1 of a liquid crystal capsule according to an aspect of the present disclosure and comparative examples 1 and 2, and FIG. 5 is a curve showing a mode efficiency of a sample 1 of a liquid crystal capsule according to an aspect of the present disclosure and comparative examples 1 and 2.

TABLE 1

| classification | critical surface tension [mN/m] | driving voltage |
|---|---|---|
| liquid crystal | 30 | |
| comparison example 1 (shell: PMMA) | 39 | 150 V |
| comparison example 2 (shell: PiBMA) | 30 | 80 V |
| sample 1 (shell: PTMDS) | 17.3 | 60 V |

In TABLE 1, the liquid crystal capsule 142 shown in FIG. 4 including the shell 144 shown in FIG. 4 of a water insoluble polymer material in the comparative examples 1 and 2 and the sample 1 was formed through a solvent evaporation method. For example, after a polymer material for the shell 144 dissolved in a solvent, the solution of the polymer material mixed with a nematic liquid crystal of fluoric (F) liquid crystal mixture as a core material was dispersed in an aqueous solution including an emulsifying agent with a nano size (nano emulsion).

Next, the dissolved polymer material was extracted on an interface by evaporating the solvent to form the shell 144. Here, the polymer materials for the shell 144 through a solvent evaporation method in the comparative examples 1 and 2 and the sample 1 were polymethyl methacrylate (PMMA), polyisopropylmetacrylate (PiBMA) and polytetramethyldisiloxane, respectively. Polymethyl methacrylate (PMMA), polyisopropylmetacrylate (PiBMA) and polytetramethyldisiloxane have an excellent water-resisting property and an excellent transmittance.

The solvent for the polymer material of the shell 144 were one of aceton, methylene chloride, chloroform and ethyl acetate having an excellent solubility for a polymer and evaporating at a relatively low temperature. When the solvent is used by a content lower than about 5 wt %, a concentration of the solution of the polymer material increases and the solution has a relatively high viscosity. Since dispersibility in a dispersion medium such as an aqueous solution is reduced, it becomes difficult to adjust a size of a dispersed particle. When the solvent is used by a content higher than about 20 wt %, a concentration of the solution of the polymer material decreases and a time for complete evaporation of the solvent increases such that a process time increases. As a result, the solvent may be used so that the solution of the polymer material can have a concentration of about 5 wt % to about 20 wt %.

The binder 148 (of FIG. 2) of the liquid crystal layer 140 (of FIG. 2) has an excellent dispersibility with the plurality of liquid crystal capsules 142 (of FIG. 2). In addition, the binder 148 has an excellent adhesion to the substrate 120 (of FIG. 2) and an excellent electric insulation. The binder 148 has an isotropic refractive index property and a relatively high transmittance. For example, the binder 148 may have a refractive index similar to an average refractive index of the plurality of liquid crystal molecules 146. Although a resin having an excellent water-resisting property may be used for the binder 148, PVA having an excellent dispersibility was used for the binder 148 to verify the driving voltage of each liquid crystal capsule 142.

As shown in TABLE 1, the plurality of liquid crystal molecules 146 was formed of a nematic liquid crystal having a critical surface tension of about 30 mN/m. The shell 144 surrounding the plurality of liquid crystal molecules 146 was formed of PMMA having a critical surface tension of about 39 mN/m in the comparative example 1, polyisopropylmetacrylate (PiBMA) having a critical surface tension of about 39 mN/m in the comparative example 2 and polytetramethyldisiloxane having a critical surface tension of about 17.3 mN/m in the sample 1.

In the comparative example 1, the critical surface tension of the shell 144 is greater than the critical surface tension of the liquid crystal molecule 146. In the comparative example 2, the critical surface tension of the shell 144 is the same as the critical surface tension of the liquid crystal molecule 146. In the sample 1, the critical surface tension of the shell 144 is smaller than the critical surface tension of the liquid crystal molecule 146.

As shown in TABLE 1 and FIG. 5, the driving voltages of the liquid crystal capsule 142 of the comparative examples 1 and 2 and the sample 1 were about 150V, about 80V and about 60V, respectively. In the comparative example 1 where the critical surface tension of the shell 144 is greater than the critical surface tension of the liquid crystal molecule 146 and the comparative example 2 where the critical surface tension of the shell 144 is the same as the critical surface tension of the liquid crystal molecule 146, the driving voltage is greater than a target value of about 60V and it is not easy to apply the liquid crystal capsule 142 to the LCD device 110 (of FIG. 2). In the sample 1 where the critical surface tension of the shell 144 is smaller than the critical surface tension of the liquid crystal molecule 146, the driving voltage is equal to or smaller than a target value of about 60V and it is easy to apply the liquid crystal capsule 142 to the LCD device 110. Here, a mode efficiency is a value proportional to a transmittance of the liquid crystal layer 140 and the driving voltage may be defined by a voltage at about 90% of a maximum mode efficiency.

In the LCD device 110 according to an aspect of the present disclosure, since the shell 144 includes the polymer material having the critical surface tension smaller than the critical surface tension of the plurality of liquid crystal molecules 146, the anchoring energy of the liquid crystal capsule 142 is reduced and the driving voltage of the liquid crystal layer 140 is reduced. As a result, the liquid crystal capsule 142 may be easily applied to the LCD device 110. Further, since the liquid crystal layer 140 including the liquid crystal capsule 142 is formed as a film type through a simple process such as a coating and a curing, a fabrication process may be simplified.

In another aspect, a driving voltage may be further reduced by adding an additive of a polymer material having a critical surface tension smaller than a critical surface tension of a liquid crystal molecule in a shell of a liquid crystal capsule.

Figure 6:
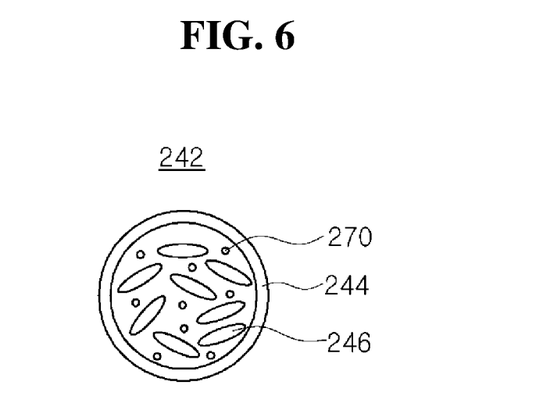
FIG. 6 is a schematic view showing a liquid crystal capsule according to another aspect of the present disclosure.

FIG. 6 is a view showing a liquid crystal capsule according to a second aspect of the present disclosure. Illustration for the same part as the first aspect will be omitted.

In FIG. 6, a liquid crystal capsule 242 according to another aspect of the present disclosure includes a shell 244, a plurality of liquid crystal molecules 246 dispersed in the shell 244 and an additive 270 mixed with the plurality of liquid crystal molecules 246. The additive 270 may include a polymer material having a critical surface tension $\gamma_c$ smaller than a critical surface tension $\gamma_c$ of the plurality of liquid crystal molecules 246 as a host. As a result, an anchoring energy of the liquid crystal capsule 242 is reduced and a driving voltage of the liquid crystal layer including the liquid crystal capsule 242 is reduced below about 60V so that the liquid crystal capsule 242 can be applied to the LCD device.

The shell 244 surrounds an outer surface of a core material including the plurality of liquid crystal molecules 246 and the additive 270 having a spherical droplet in an initial state to function as an outer wall fixing the core material. The core material including the plurality of liquid crystal molecules 246 and the additive 270 may exist in a state confined in the shell 244 of the polymer material.

The polymer material of the shell 244 may be classified into a water soluble polymer material and a water insoluble (i.e., an oil soluble) polymer material.

Since the additive 270 of the polymer material having a critical surface tension $\gamma_c$ smaller than a critical surface tension $\gamma_c$ of the plurality of liquid crystal molecules 246 is mixed to the plurality of liquid crystal molecules 246, an anchoring energy of the shell 244 is reduced and a driving voltage of the liquid crystal layer including the liquid crystal capsule 242 is reduced.

Figure 7:
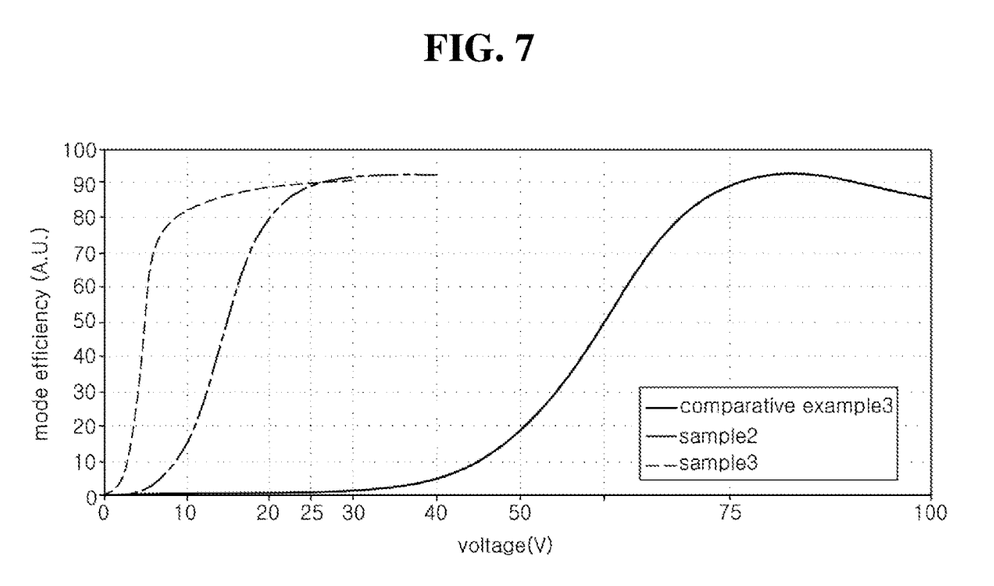
FIG. 7 is a curve showing a mode efficiency of samples 2 and 3 of a liquid crystal capsule according to an aspect of the present disclosure and a comparative example 3.

TABLE 2 shows a critical surface tension and a driving voltage of samples 2 and 3 of a liquid crystal capsule according to another aspect of the present disclosure and a comparative example 3, and FIG. 7 is a curve showing a mode efficiency of samples 2 and 3 of a liquid crystal capsule according to an aspect of the present disclosure and a comparative example 3.

TABLE 2

| classification | critical surface tension [mN/m] | driving voltage |
| --- | --- | --- |
| shell (PVA) | 37 | |
| liquid crystal | 30 | |
| comparison example 2 (additive 1) | 36 | 80 V |
| sample 2 (additive 2) | 26 | 30 V |
| sample 3 (additive 3) | 20 | 15 V |

In TABLE 2, the liquid crystal capsule 242 (shown in FIG. 6) including the shell 244 (shown in FIG. 6) of a water soluble polymer material in the comparative example 3 and the samples 2 and 3 was formed through a coacervation method. For example, after a hydrophilic polymer material for the shell 244 dissolved in an aqueous solution, the solution of the hydrophilic polymer material mixed with a nematic liquid crystal of fluoric (F) liquid crystal mixture as a core material and an additive (e.g., additives 1, 2 and 3) for emulsifying and adjusting a critical surface tension was dispersed in an aqueous solution including an emulsifying agent with a nano size (i.e., nano emulsion).

Here, a polymer whose solubility is greatly changed in an aqueous solution according to a temperature or acidity (pH) may be used as a hydrophilic polymer material for the shell 244 through a coacervation method. Polyvinyl alcohol (PVA) whose solubility is relatively high at a room temperature and is rapidly reduced over a temperature of about 50° C. was used as the hydrophilic polymer material, and the shell 244 was formed by phase separation of a nano emulsion at a temperature of about 50° C. to about 60° C.

For reinforcing a stability of the shell 244 according to a temperature, a cross linking through a reaction with hydro oxide of PVA is required. As a result, after the shell 244 was formed, glutaraldehyde as a cross linking agent was added to reinforce a stability.

The additive 270 having a critical surface tension smaller than a critical surface tension of the liquid crystal molecule 246 exists in the shell 244, and PVA of the capsulized shell 244 and residual PVA exist in the aqueous solution. As a result, the aqueous solution may be coated on the substrate without an additional binder.

As shown in TABLE 2, the shell 244 was formed of PVA having a critical surface tension of about 37 mN/m, and the plurality of liquid crystal molecules 246 were formed of a nematic liquid crystal having a critical surface tension of about 30 mN/m. In the comparative example 3, an additive 1 mixed to the plurality of liquid crystal molecules 246 was one of 2-[2-(allyloxy)ethoxylethanol] represented by a chemical formula 1 and having a critical surface tension of about 32.1 mN/m, 2,5,8,11,14,17-hexaoxanonadecane represented by a chemical formula 2 and having a critical surface tension of about 31.7 mN/m and surfynol 104 represented by a chemical formula 3 and having a critical surface tension of about 36.2 mN/m.

[Chemical Formula 1]

[Chemical Formula 2]

[Chemical Formula 3]

In the sample 2, an additive 2 mixed to the plurality of liquid crystal molecules 246 was one of 1,5,5-trimethyl-6-acetylmethyl-cyclohexene represented by a chemical formula 4 and having a critical surface tension of about 25.2 mN/m and 5-butyldimethylsilyloxy-2,6-dimethylnon-1-en-3-yne represented by a chemical formula 5 and having a critical surface tension of about 26.0 mN/m

[Chemical Formula 4]

[Chemical Formula 5]

In the sample 3, an additive 3 mixed to the plurality of liquid crystal molecules 246 was one of octamethyltrisiloxane represented by a chemical formula 6 and having a critical surface tension of about 14.8 mN/m and tris(trimethylsilyl)borate represented by a chemical formula 7 and having a critical surface tension of about 16.6 mN/m

[Chemical Formula 6]

[Chemical Formula 7]

The critical surface tension of the additive 1 is greater than the critical surface tension of the liquid crystal molecule 246 in the comparative example 3, and the critical surface tension of the additives 2 and 3 (270) is smaller than the critical surface tension of the liquid crystal molecule 246 in the samples 2 and 3.

As shown in TABLE 2 and FIG. 7, the driving voltages of the liquid crystal capsule 242 of the comparative example 3 and the samples 2 and 3 were about 80V, about 30V and about 150V, respectively. In the comparative example 3 where the critical surface tension of the additive 1 is greater than the critical surface tension of the liquid crystal molecule 246, the driving voltage is greater than a target value of about 60V and it is not easy to apply the liquid crystal capsule 242 to the LCD device. In the samples 2 and 3 where the critical surface tension of the additives 2 and 3 (270) is smaller than the critical surface tension of the liquid crystal molecule 246, the driving voltage is equal to or smaller than a target value of about 60V and it is easy to apply the liquid crystal capsule 242 to the LCD device. Here, a mode efficiency is a value proportional to a transmittance of the liquid crystal layer and the driving voltage may be defined by a voltage at about 90% of a maximum mode efficiency.

In the LCD device according to another aspect of the present disclosure, since the core in the shell 244 is formed by mixing the additive of the polymer material having the critical surface tension smaller than the critical surface tension of the plurality of liquid crystal molecules 246 to the plurality of liquid crystal molecules 246, the anchoring energy of the liquid crystal capsule 242 is reduced and the driving voltage of the liquid crystal layer is reduced. As a result, the liquid crystal capsule 242 may be easily applied to the LCD device. Further, since the liquid crystal layer including the liquid crystal capsule 242 is formed as a film type through a simple process such as a coating and curing process, a fabrication process may be simplified.

In another aspect, a driving voltage may be further reduced by forming an additive layer of a polymer material having a critical surface tension smaller than a critical surface tension of a liquid crystal molecule in a shell of a liquid crystal capsule.

Figure 8:
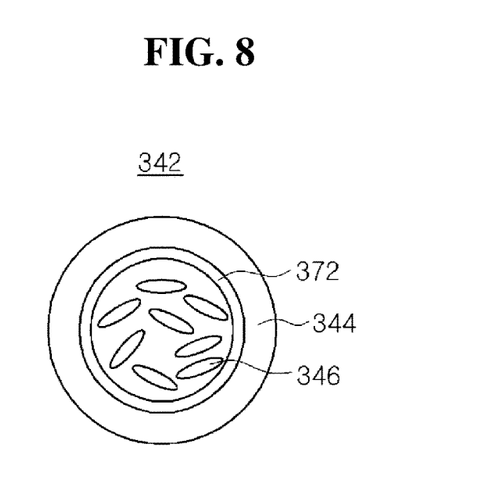
FIG. 8 is a schematic view showing a liquid crystal capsule according to yet another aspect of the present disclosure.

FIG. 8 is a view showing a liquid crystal capsule according to yet another aspect of the present disclosure. Illustration for the same part as the other aspects will be omitted.

In FIG. 8, a liquid crystal capsule 342 according to yet another aspect of the present disclosure includes a shell 344, a plurality of liquid crystal molecules 346 dispersed in the shell 344 and an additive layer 372 between the shell 344 and the plurality of liquid crystal molecules 346. The additive layer 372 may include a polymer material having a critical surface tension $\gamma_c$ smaller than a critical surface tension $\gamma_c$ of the plurality of liquid crystal molecules 346 as a host. As a result, an anchoring energy of the liquid crystal capsule 342 is reduced and a driving voltage of the liquid crystal layer including the liquid crystal capsule 342 is reduced below about 60V so that the liquid crystal capsule 342 can be applied to the LCD device.

The shell 344 surrounds an outer surface of a core material including the plurality of liquid crystal molecules 346 having a spherical droplet in an initial state and the additive 370 (shown in FIG. 9B) to function as an outer wall fixing the core material. The core material including the plurality of liquid crystal molecules 346 and the additive 370 may exist in a state confined in the shell 344 of the polymer material.

The polymer material of the shell 344 may be classified into a water soluble polymer material and a water insoluble (i.e., an oil soluble) polymer material.

Figure 9A:
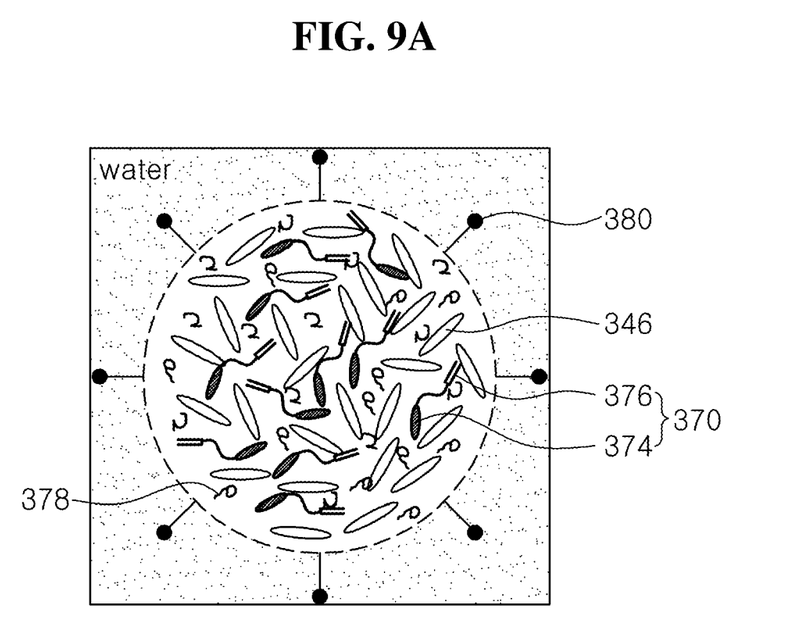
FIGS. 9A to 9C are views showing a method of fabricating a liquid crystal capsule according to an aspect of the present disclosure.
Figure 9B:
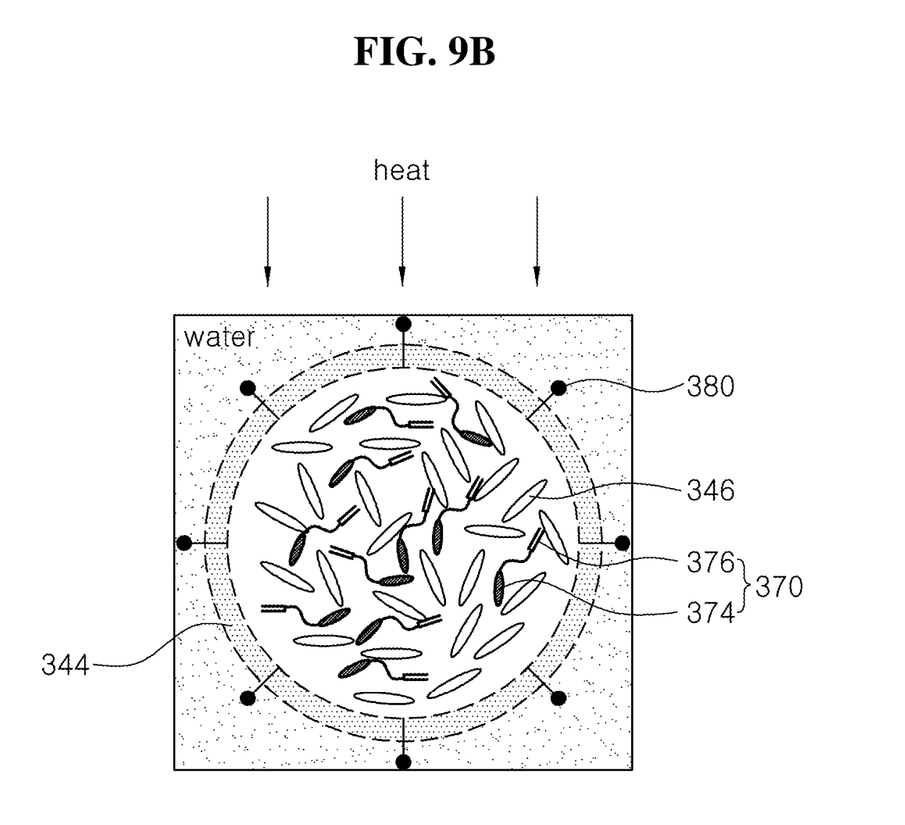
Figure 9C:
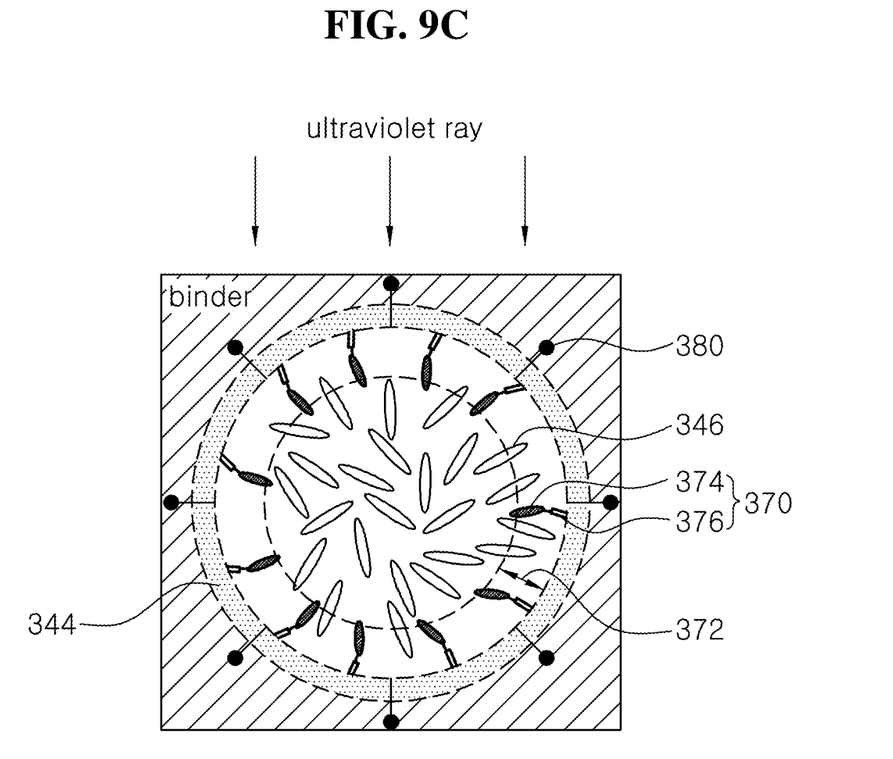

FIGS. 9A to 9C are views showing a method of fabricating a liquid crystal capsule according to a third aspect of the present disclosure. Illustration for the same part as the first and second aspects will be omitted.

In FIG. 9A, after a liquid crystal molecule 346, a shell monomer 378, a reactive monomer type additive 370 and a surfactant 380 are mixed to form a mixture, the mixture is dispersed in a solution such as a water with a nano size (i.e., nano emulsion). As a result, the liquid crystal 346, the shell monomer 378, the reactive monomer type additive 370 and the surfactant 380 are mixed to form a spherical droplet of a nano size, and the surfactant 380 is disposed on an outer surface of the spherical droplet.

The reactive monomer type additive 370 may include an adjustor 374 adjusting an anchoring energy and a reactor reacting to an ultraviolet (UV) ray and may have a critical surface tension smaller than a critical surface tension of the liquid crystal molecule 346 due to the adjustor 374.

In FIG. 9B, when a heat is added to an aqueous solution of the spherical droplet, the shell monomer 378 is polymerized to form a shell 344 on an outer surface of the spherical droplet. The reactive monomer type additive 370 is kept in a state where the reactive monomer type additive 370 is mixed with the liquid crystal molecule 346 in the shell 344. Since the shell 344 is surrounded by water, an influence by an external ultraviolet (UV) ray is minimized and a reaction of the reactor 376 of the reactive monomer type additive 370 is restrained.

In FIG. 9C, after a coating solution is formed by mixing the aqueous solution of the shell 344 with a binder, a coating solution layer is formed by coating the coating solution on a substrate and water is removed by heating the coating solution layer. (dry step) As a result, the coating solution layer on the substrate includes the binder and the shell 344 dispersed in the binder.

Next, since the water is removed from an exterior of the shell 344, the reactor 376 of the reactive monomer type additive 370 reacts to the UV ray to be fixed to an inner surface of the shell 344 when the UV ray is irradiated onto the shell 344. As a result, the reactive monomer type additive 370 is laminated on the inner surface of the shell 344 to form an additive layer 372.

In the LCD device according to yet another aspect of the present disclosure, since the additive layer 372 of the polymer material having the critical surface tension smaller than the critical surface tension of the plurality of liquid crystal molecules 346 is formed on the inner surface of the shell 344, the anchoring energy of the liquid crystal capsule 342 is reduced and the driving voltage of the liquid crystal layer is reduced. As a result, the liquid crystal capsule 342 may be easily applied to the LCD device. Further, since the anchoring energy of the liquid crystal capsule 342 is adjusted by the additive layer 372 between the liquid crystal molecule 346 and the shell 344, a change in a physical property of the liquid crystal molecule 346 due to the additive is prevented and a degree of freedom of selection with respect to the polymer material of the shell 344 increases. In addition, since the liquid crystal layer including the liquid crystal capsule 342 is formed as a film type through a simple process such as a coating and curing process, a fabrication process can be simplified.

Consequently, in an LCD device according to an aspect of the present disclosure, since an anchoring energy of a liquid crystal capsule is reduced by adjusting a critical surface tension of a shell and a liquid crystal molecule, a fabrication process is simplified and a driving voltage of a liquid crystal layer is reduced. Further, since an anchoring energy of a liquid crystal capsule is reduced by adjusting a critical surface tension of an additive, a fabrication process is simplified and a driving voltage of a liquid crystal layer is reduced.

It will be apparent to those skilled in the art that various modifications and variations can be made in a LCD device including a liquid crystal capsule and a method of fabricating the same of the present disclosure without departing from the sprit or scope of the disclosure. Thus, it is intended that the present disclosure covers the modifications and variations of these aspects provided they come within the scope of the appended claims and their equivalents.

What is claimed is:

1. A liquid crystal display device, comprising:
a substrate;
a thin film transistor in a pixel region on the substrate;
a pixel electrode connected to the thin film transistor;
a common electrode over the thin film transistor; and
a liquid crystal layer over the pixel electrode and the common electrode, the liquid crystal layer including a liquid crystal capsule,
wherein the liquid crystal capsule comprises:
a shell; and
a liquid crystal molecule dispersed in the shell,
wherein the shell has a critical surface tension smaller than that of the liquid crystal molecule,
wherein the critical surface tension of the liquid crystal molecule and the shell is obtained from a graph of a cosine value of a contact angle of reference liquid droplets with respect to a surface tension of the liquid crystal molecule and the shell, and
wherein the liquid crystal molecule includes a nematic liquid crystal and the shell includes polytetramethyldisiloxane.

2. The liquid crystal display device of claim 1, further comprising an additive in the shell.

3. The liquid crystal display device of claim 2, wherein the additive has a critical surface tension smaller than that of the liquid crystal molecule.

4. The liquid crystal capsule display device of claim 3, wherein the additive includes one of 1,5,5-trimethyl-6-acetylmethyl-cyclohexene, 5-butyldimethylsilyloxy-2,6-dimethylnon-1-en-3-yne, octamethyltrisiloxane and tris(trimethylsilyl)borate.

5. The liquid crystal display device of claim 2, wherein the additive is formed as an additive layer disposed between the liquid crystal molecule and the shell.

6. The liquid crystal display device of claim 2, wherein the additive includes an adjustor adjusting an anchoring energy and a reactor reacting to an ultraviolet ray.

* * * * *